United States Patent [19]
Lindquist

[11] 3,760,990
[45] Sept. 25, 1973

[54] APPARATUS FOR SUPPLYING POWDER

[75] Inventor: Jonas T. Lindquist, Skokie, Ill.

[73] Assignee: Oxy-Dry Sprayer Corporation, Chicago, Ill.

[22] Filed: Aug. 2, 1971

[21] Appl. No.: 168,470

Related U.S. Application Data

[63] Continuation of Ser. No. 830,278, June 4, 1969, abandoned.

[52] U.S. Cl. .............. 222/371, 248/23, 222/DIG. 1
[51] Int. Cl. ............................................. B65g 15/0
[58] Field of Search ................ 222/56, 414, 415, 222/371, 197, 365, 318; 198/169, 208; 248/23, 22, 19

[56] References Cited
UNITED STATES PATENTS

| 2,563,321 | 8/1951 | Dugan | 198/169 |
| 1,511,401 | 10/1924 | Davis | 221/253 X |
| 1,707,144 | 3/1929 | Simone | 221/253 X |
| 3,244,325 | 4/1966 | Lindquist | 222/371 X |
| 3,123,256 | 3/1964 | Smith et al. | 222/241 X |
| 2,196,891 | 4/1940 | Berndt | 248/23 |

Primary Examiner—Robert B. Reeves
Assistant Examiner—James M. Slattery
Attorney—Wolfe, Hubbard, Legdig, Voit & Osann

[57] ABSTRACT

An apparatus for supplying or transporting powder to a dispenser comprising an endless chain which is held taut between a drive wheel having a the rear surface shaped to accept the chain and turn-around wheel. To minimize strain, tension and the like, the drive and turn-around wheels are positioned to maintain the chain in a single plane. In the preferred embodiment, the motor for the drive wheel is mounted to automatically compensate for the development of any strain, tension or the like on the endless chain that would otherwise disturb the operation. hingedly

12 Claims, 8 Drawing Figures

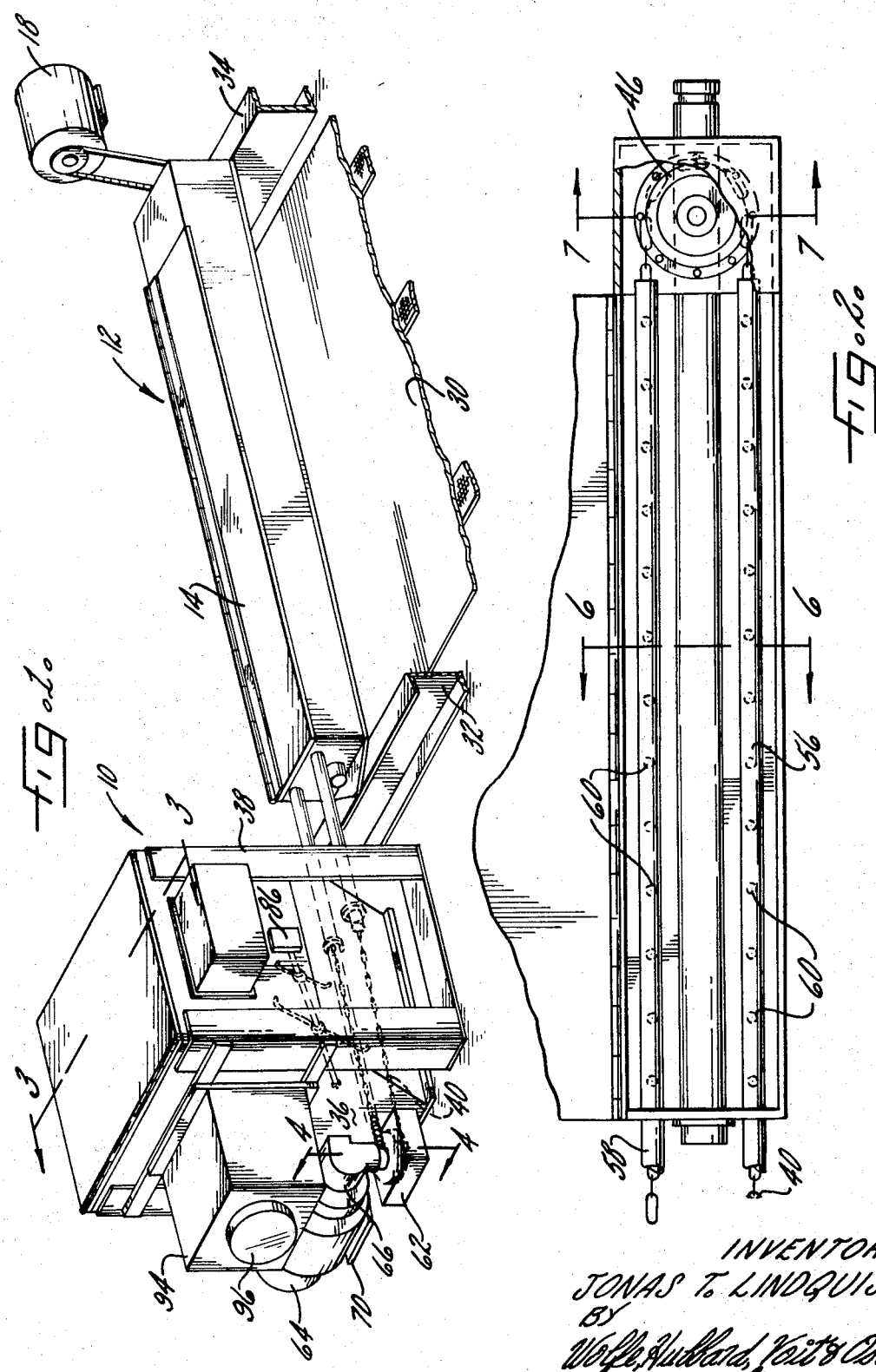

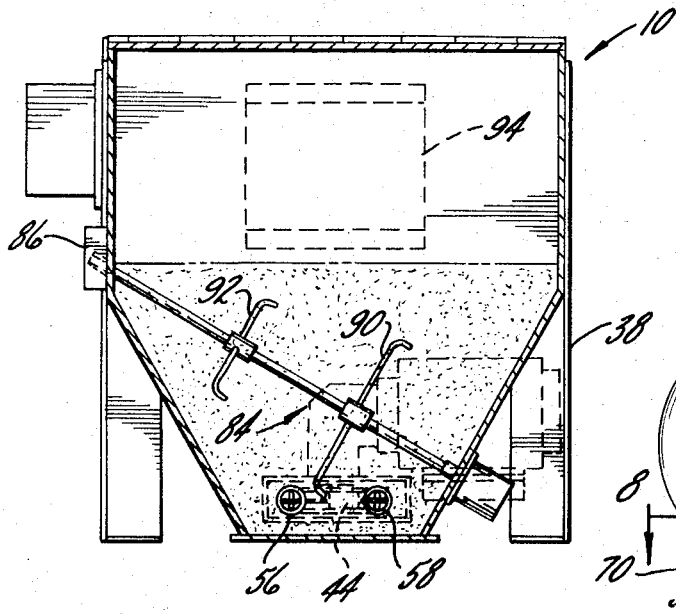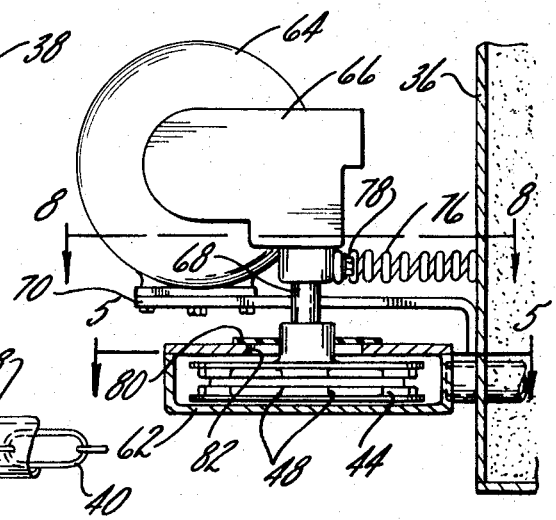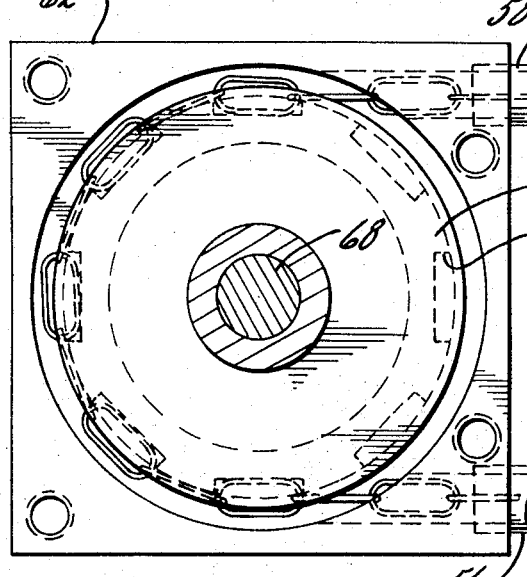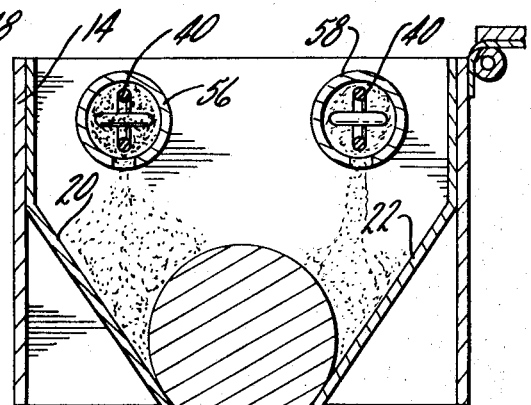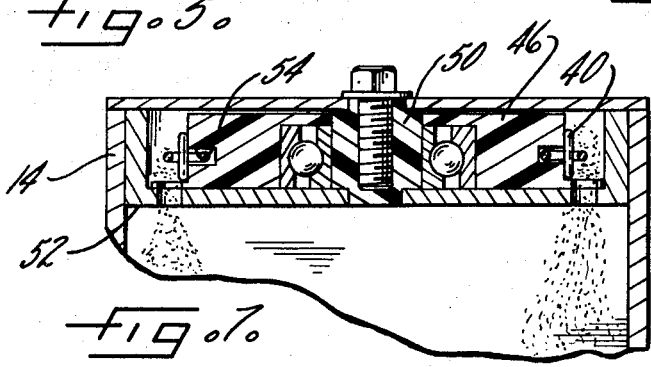

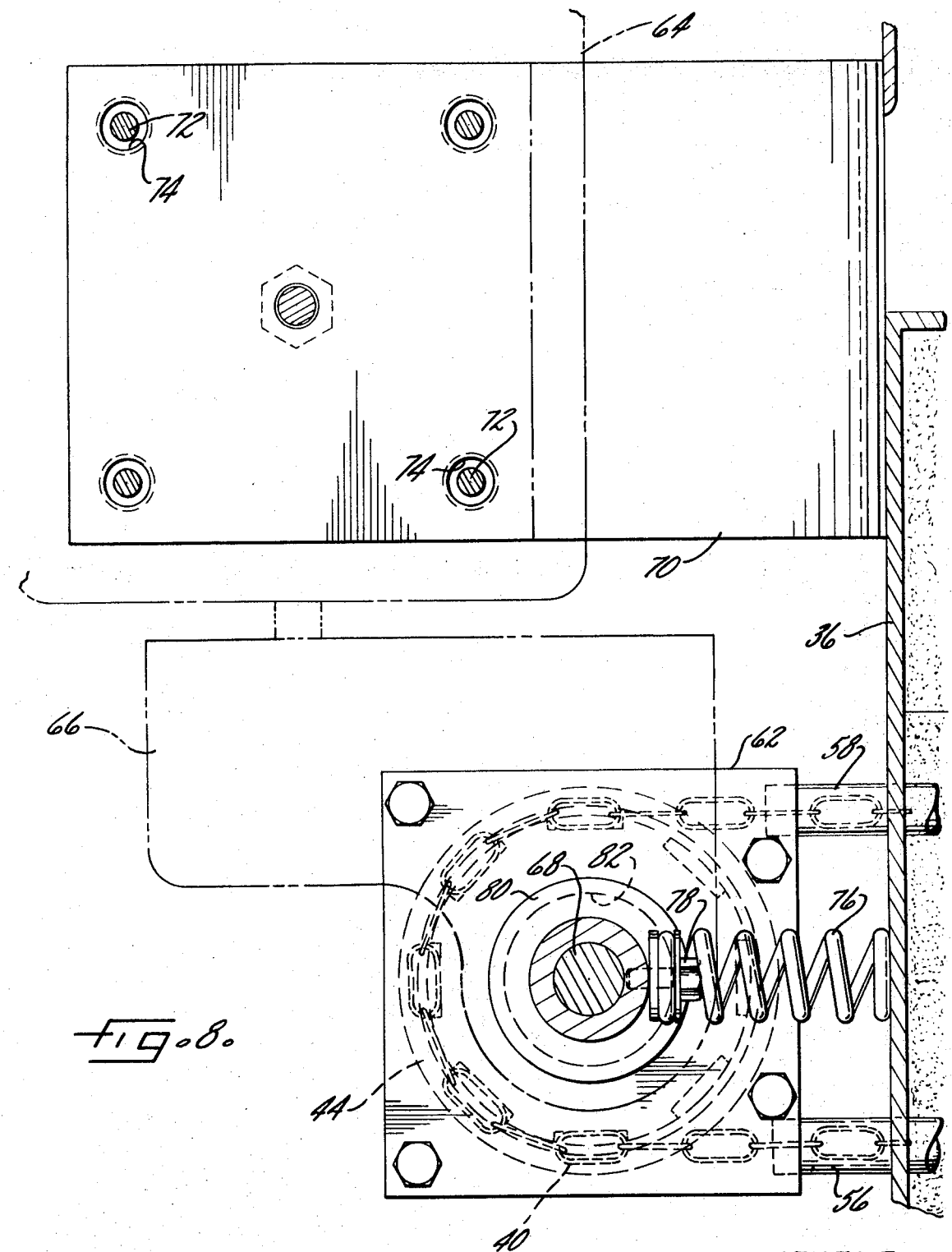

APPARATUS FOR SUPPLYING POWDER

This application is a continuation of my copending application Ser. No. 830,278, filed June 4, 1969, now abandoned.

This invention relates to powder supplying apparatus and, more particularly, to an improved apparatus for supplying or transporting powder which is characterized, in use, by a significantly reduced strain on its components.

U.S. Pat. No. 3,244,325 to Lindquist illustrates an apparatus that has been used for delivering a predetermined amount of powder to a trough to be dispensed threrfrom by a roller. In the illustrative embodiment, a ball chain is employed to transfer powder from a reservoir to the trough of the dispenser. A motor pulls the chain in an upward direction through the reservoir and then by gravity, the chain moves downwardly through a chute formed in the reservoir. Enough slack is provided so that the balls on the chain are allowed to form a loose stack.

The chain then travels across the reservoir in a generally horizontal direction and carries with it a predetermined amount of powder into the trough. The chain is encircled by a conduit that is positioned in the trough. The inlet half of the conduit is provided with a series of spaced holes. The powder is transferred into the trough as long as the powder does not close the holes. The apparatus runs continuously and the powder is merely recycled into the reservoir when the trough is filled. While the hereinbefore described apparatus is generally suitable for transferring the powder, the ball chain is often placed under a considerable amount of tension or other disturbing forces which tends to impair the optimal efficiency of the apparatus. It is accordingly a primary object of the present invention to provide an improved apparatus that may efficiently and economically transport powder to a dispenser at any desired rate.

A further object of the present invention is the provision of an apparatus for transporting powder to a dispenser wherein the tension, strain or other disturbing forces on the components of the apparatus is minimized.

A still further object is to provide an apparatus of the hereinbefore described type wherein there are included means for automatically compensating for, or dissipating of, the strain, tension or other disturbing forces on the components as the forces develop.

An additional object of the present invention is to provide an apparatus for transporting powder to a dispenser in which the apparatus components are most efficiently used so as to maximize their useful life.

It is a still further object to provide a powder transporting apparatus wherein any substantial powder build-up within the apparatus of an undesirable nature is avoided.

Another object is the provision of a powder transporting apparatus wherein the powder is maintained in a transporting state.

Other objects and advantages of the invention will become apparent as the following description proceeds, taken in conjunction with the accompanying drawings, in which:

FIG. 1 is a perspective view of an exemplary embodiment of the powder transporting apparatus of the present invention and illustrating the use of the present invention in connection with a dispensing apparatus which applies a coating of powder onto a sheet passing below;

FIG. 2 is a fragmentary top elevational, partial cross section view of the dispensing apparatus or dispenser shown in FIG. 1 and illustrating the means by which the powder is transferred from the powder-carrying mechanism to the dispenser;

FIG. 3 is a cross sectional view taken along lines 3—3 of FIG. 1 and illustrating one means for maintaining the powder in a transportable state;

FIG. 4 is an enlarged fragmentary view taken generally along the lines 4—4 of FIG. 1 and showing one embodiment which may be employed to compensate for any tension or other disturbing forces that may develop in the powder-carrying mechanism;

FIG. 5 is a cross sectional view taken along lines 5—5 of FIG. 4 and further illustrating the relationship of the powder-carrying mechanism and the drive wheel;

FIG. 6 is a cross sectional view taken along lines 6—6 of FIG. 2 and showing the relative positioning of the powder-carrying mechanism, the conduit surrounding the mechanism and the powder dispenser;

FIG. 7 is a cross sectional view taken along lines 7—7 of FIG. 2 and illustrating the relationship between the powder-carrying mechanism and the turn-around wheel; and FIG. 8 is a cross sectional view taken along lines 8—8 of FIG. 4 and further showing the "floating" motor compensating for a development of tension in the powder-carrying chain.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention. For example, while the invention will be described in connection with an electrostatic powder sprayer, it should be appreciated that the present invention may be advantageously employed with any type of powder dispenser. It should be similarly apparent that the particular powder being transported is not critical. The powder may be a starch such as are generally used in anti-offsetting devices in the printing field but may also be talc or any other powder that is dispensed in industrial operations.

Referring now to th drawings, there is shown in FIG. 1 an exemplary embodiment of the powder transporting apparatus of the present invention being employed in connection with an electrostatic powder sprayer, such as is disclosed in Buhler U.S. Pat. No. 3,344,312. Thus, the powder transporting apparatus is shown generally at 10 and provides a predetermined amount of powder to an electrostatic powder sprayer 12. The sprayer 12, as best seen in FIG. 6, includes a hopper 14 and a dispensing roller 16 which is rotated in the direction indicated by the arrow. Any conventional means such as motor 18 (FIG. 1) may be used to rotate the dispensing roller. Sidewalls 20 and 22 cooperate with the dispensing roll 16 to serve as metering blades; and, with the roller being rotated in the direction shown by the arrow, a film of powder develops on the roll 16 as the roll rotates and the powder exits the hopper as indicated at 24. Electrostatic tubes 26 and 28 are positioned (by means not shown) below the dispensing roller and the powder is blasted off the dispensing roll and coats a moving surface 30 (FIG. 1) such as freshly printed paper, passing below the sprayer. In certain situations, it may be necessary to have only one tube. The sprayer 12 may be mounted on support members 32 and 34 by any conventional means, such as bolts or the like (not shown).

To serve as the powder supply, and as best shown in FIGS. 1 and 3, there is provided a powder reservoir 36 which may be retained within a support, shown generally at 38. Desirably, at least the lower portions of the sides of the reservoir are sloped inwardly to aid in feeding the powder to the powder-carrying mechanism as will be hereinafter described. The powder is transported between the reservoir and the dispenser or sprayer hopper by an endless chain 40 (FIGS. 1 and 6). In accordance with one aspect of the present invention, the chain that is employed is sufficiently rigid so that it will not elongate, even under significant tension or strain any more than, for example, less than about 1 inch and is shaped so that the movement imparted to the powder will be generally toward the chain as opposed to urging the powder outwardly toward the wall of any conduit encircling the chain. In the exemplary embodiment, the endless chain 40 (FIGS. 5 and 6) comprises a series of links 42 which are made of stainless steel and are welded together. The employment of this link chain has also been found to be particularly advantageous in that, in use, some of the links appear to serve as powder-carrying compartments.

To move the endless chain sequentially through the powder reservoir and the dispenser and to allow the chain to be spatially positioned in the apparatus in accordance with the present invention, a drive wheel and turn-around wheel are provided. As shown in FIGS. 1 and 2, the endless chain 40 is positioned between a drive wheel 44 and a turn-around wheel 46 and is maintained in a relatively taut relationship so that the individual links are maintained substantially in a perpendicular relationship as seen in FIGS. 5 and 7. The drive wheel 44 (see FIGS. 4 and 5) may be made of a metal such as aluminum or hardened steel and has its peripheral surface formed with grooves 48 shaped complementally to accept drive links 42 so as to provide a positive gripping force. As can be seen in FIG. 7, the turn-around wheel 46 is rotatably mounted at 50 and is supported on bed 52, which is located at the end of the sprayer that is away from the powder reservoir. The surface of the turn-around wheel 46 is formed with a continuous groove, as indicated at 54 (FIG. 7). While there may be some slippage in normal operation, this is minimized by the tautness of the chain and the friction contact between the wheel and some of the links. However, if tension or other forces begin to develop, the slippage may increase so as to assist in compensating for such forces. The turn-around wheel may be formed of any conventionally used metal such as steel or the like or of any plastic material such as polytetrafluoroethylene or the like. It is preferred to employ a material with good wear resistance.

In accordance with another aspect of the present invention, the drive and turn-around wheels are positioned so that the endless chain lies in substantially a single plane. By this it is meant that the chain, considering one of its external surfaces in the direction of movement of the chain, lies substantially in a single plane. Thus, as can best be seen from FIGS. 1 and 2, this is accomplished by maintaining the drive and turn-around wheels in the same plane. This minimizes the development of any significant amount of tension on the chain and allows the apparatus to carry out the powder transfer without interruptions due to chain breakage.

A conduit is provided to allow the powder to be transferred from the powder-carrying chain to the dispenser. Thus, as is shown in FIGS. 1, 2 and 6, an incoming conduit 56 encircles the endless chain 40 and extends from the interior of the powder reservoir 36 to the bed 52 in the sprayer 12. An outlet conduit 58 is provided and connects the exit end of the turn-around wheel 46 to the interior of the powder reservoir. If desired, gaskets or seals may be used at the points where the conduits enter and leave either the powder reservoir or sprayer.

To allow the powder to be transferred, the conduits 56 and 58 may be provided with a series of spaced holes 60. The conduits may be formed of any material such as, for example, nylon, polyetrafluorethylene or the like and the spacing of the holes may be varied within wide limits. However, it is desirable to place the holes sufficiently close to each other so that the discharge of the powder from adjacent holes will flow together rather than remaining apart and forming high and low spots in the hopper of the dispenser. As may be appreciated, the exact spacing may thus vary somewhat depending upon the particular type of powder that is being dispensed.

According to one feature of the present invention, the exit conduit from the powder dispenser extends through the powder reservoir to the drive wheel to minimize powder build-up in the apparatus. Thus, as is best seen in FIG. 5, outlet conduit 58 terminates in a block 62 which houses the drive wheel 44. In this fashion, the endless chain will not pick up powder in the reservoir until the chain has left the drive wheel. This minimizes the possible interference that could occur due to powder build-up in the exterior surfaces of the drive wheel and in the apparatus drive system.

The motive source for the drive wheel may be any conventional source of torque. As illustrated in FIG. 4, a motor 64 is connected to a conventional reduction gear box 66, with the drive wheel being connected by any conventional means (not shown) to a shaft 68.

In accordance with a further feature of the present invention, means are provided so that the development of undue tension or other disturbing forces on the endless chain may be automatically dissipated or compensated for as it develops. To this end, and as illustrated in FIGS. 4 and 8 of the illustrative embodiment, the compensating means comprises a resilient mounting for the motor, the drive wheel and the housing, which, in effect, provides a "floating" motor. Thus, a mounting plate 70 is attached to the powder reservoir 36 by any conventional means (not shown) such as welding or the like. The motor is mounted on the plate by a series of screws 72 that are fitted in oversized holes 74. A compression spring 76 is positioned between the powder reservoir 36 and the drive wheel shaft 68 by means such as a stud or screw 78. A resilient or rubber cover 80 may be positioned over the opening 82 in the drive wheel housing to prevent foreign matter from contaminating the drive wheel. Under normal operating conditions, the compression spring 76 holds the motor "tight" in the oversized holes 74. However, as can best be seen in FIG. 8, when tension on the chain 40 begins to develop such as when a twisted link is encountered, this is automatically dissipated by the tension overcoming the bias of the spring. Thus, the increasing tension causes the motor, the drive wheel shaft and the drive wheel to move or rotate slightly (e.g. — less than 1 inch, generally about one-fourth inch or less). The resilient cover allows the drive wheel shaft to move without exposing the drive wheel or the system to possible contaminants.

To prevent the endless chain from merely "tunneling" through the powder in the reservoir, means are provided for agitating the powder to maintain it in a transportable state and to simultaneously aid in filling the chain links with powder. To this end, and as shown in FIGS. 1 and 3, the illustrative embodiment comprises an agitator 84 journalled as indicated at 86 for rotation and powered by a small conventional motor 88. Agitation is achieved by two spaced arms 90 and 92. In the preferred embodiment, there are at least two spaced arms with each being located above the endless chain. The lower arm 90 is preferably positioned so that it passes just above the chain so as to insure transportable powder in the area of the chain while simultaneously moving powder into the chain links. The other arm ahould be of a sufficient size to maintain at least a significant portion of the powder in the reservoir from undue packing or agglomerating that would impair the operation. In this connection, with the chain located close to the bottom of the powder reservoir, the spaced arms of the agitator cooperate with the tapered shape of the reservoir to provide an efficient system for loading the powder-carrying chain.

To provide for maximizing the useful life of the components, the apparatus is designed to operate on an intermittent basis. Thus, depending upon the rate at which the powder is being dispensed from the sprayer or other dispenser, the powder-transporting apparatus is allowed to run for a predetermined time and is then stopped for a second predetermined time and the cycle is then repeated. As shown in block form in FIG. 1, a conventional timer 94, which may be set as desired by dial 96, is mounted on the reservoir and is electrically connected (by means not shown) to the motors 64 and 88. A control box 98 may be mounted on the reservoir to provide on-off switches for the motors.

When the timer 94 actuates the drive motor 64 and the agitator motor 88, the links 42 of the endless chain 40 are positively gripped on the complementally shaped peripheral surface of the drive wheel 44 and the chain passes through the powder reservoir, picking up powder with the assistance of the agitator arms. The powder is then transported through inlet conduit 56 and part or all of the powder passes through some of the holes 60. The chain passes around turn-around wheel 46 and substantially all of the remainder of the powder is despensed through the holes 60 in outlet conduit 58. Through which holes the powder passes will, of course, be dependent upon several factors, including where the powder already in the sprayer hopper is located. The extension of conduit 58 located in powder reservoir 36 prevents the pick-up of powder by the chain until the chain has passed the drive wheel and is on its exit pass through the powder reservoir. This is continued until the timer shuts off the motors after the completion of the cycle time.

As shown in the illustrative embodiment in FIG. 2, both the inlet and outlet conduits are provided with spaced holes. This is desirable in certain situations such as in the exemplary embodiment where the dispenser is desirably filled on both sides. However, it should be appreciated that only one of the conduits need be provided with spaced holes.

As a specific example to provide a powder transporting apparatus that may be advantageously used in connection with an electrostatic powder sprayer which deposits a coating of powder onto the freshly printed surface of sheets from an offset press to dissipate the normal static in the sheets, the illustrative embodiment may be operated for only about one tenth of the time. More specifically, it has been found suitable to adjust the timer so that the apparatus is in operation for 4 minutes followed by a lapse of 40 minutes before the next cycle. The exact amount of running time in any desired cycle will, of course, be dependent upon the rate at which the powder is being dispensed. The drive wheel may be formed from a metal such as aluminum or hardened steel. The dimensions of the link chain may include links of from about one half to three fourths inch when a drive wheel of about three and one half inch outside diameter is employed. To operate the drive wheel, a slow gear head motor capable of achieving about five revolutions per minute may be employed. The linear speed of the chain through the powder should be sufficiently slow, i.e. — about 10 feet per minute, so that the chain is not pulled through the powder without actually carrying any significant amount of powder. It is also desirable to maintain a certain minimum speed so that an undue amount of operating time is not needed to carry the powder to the particular dispenser. In most situations, the speed will be sufficient if the dispenser can be completely filled with powder in about 15 minutes. To serve as the conduits, nylon tubing may be employed with an inside diameter of about one half inch and with the holes being spaced apart about 1¼ inches and each having a diameter of about one eighth inch.

Thus, as has been seen, the present invention provides a powder transporting apparatus which has its components spatially disposed with respect to the dispenser for the powder so that the powder may be efficiently and economically transported without the development of any significant tension or other disturbing forces on the powder carrier that would be sufficient to disrupt the carrier or otherwise interfere with the operation. A built-in means is provided for compensating for and dissipating any significant strain or tension as it is developed. Similarly, the apparatus is designed to operate for only a small portion of the time so as to maximize the life of the components. The apparatus is also designed so that powder build-up in the components is largely avoided. An agitator is provided to not only maintain the powder in a transportable state but to also aid in the filling of the powder carrier.

I claim as my invention:

1. An apparatus for applying a film of powder upon a surface moving under the apparatus which comprises a powder reservoir, a sprayer hopper, a dispensing roller journalled in said hopper for rotation, means for rotating said dispensing roller, a metering blade positioned to cooperate with said dispensing roller to provide an egress for the powder, an endless chain in communication with said reservoir and said hopper, a drive wheel for said endless chain, a turn-around wheel spatially disposed from said drive wheel and cooperating with said wheel for holding said chain substantially taut, said drive and turn-around wheels being positioned to maintain said chain in substantially a single plane, a conduit surrounding at least a portion of said chain in said hopper and having a series of spaced holes communicating with said hopper and means for driving said drive wheel, and means for compensating for the development of tension on the chain including a resilient mounting for the drive wheel and the means for driving the drive wheel a stationary support for said driving means that permits relative rotative movement between said driving means and said support, the position of said driving means remaining constant relative to said drive wheel when said drive wheel moves to compensate for the development of tension on said chain.

2. The apparatus of claim 1 wherein increasing tension on the chain causes the means for compensating for the development of tension to allow the drive wheel and the means for driving the drive wheel to rotate in a fashion to dissipate the tension.

3. The apparatus of claim 1 wherein said chain is shaped so that the powder in said conduit is generally forced toward the center of the conduit.

4. The apparatus of claim 3 wherein said chain consists of a series of interconnected links.

5. The apparatus of claim 1 wherein said drive wheel has its peripheral surface formed with shapes complemental to the exterior of said chain.

6. The apparatus of claim 1 wherein agitating means are positioned in said powder reservoir.

7. The apparatus of claim 6 wherein said agitating means consists of a rotatable member having at least two spaced arms and a torque source, the member being positioned in said reservoir so that at least one of said arms is positioned above said endless chain and rotates in an arc slightly above the endless chain.

8. The apparatus of claim 6 wherein timing means are included to intermittently actuate said driving means and torque source simultaneously for a predetermined amount of time.

9. The apparatus of claim 1 wherein a conduit encircles said chain from the inlet to said reservoir to said drive wheel.

10. The apparatus of claim 1 wherein the conduit and chain inlet are position to be substantially directly above the egress of the powder.

11. The apparatus of claim 10 wherein the conduit encircles the chain throughout substantially all of its travel and the outlet side of said chain and the encircling conduit is positioned on the side of said dispensing roller opposite from the powder egress.

12. An apparatus for applying a film of powder upon a surface moving under the apparatus which comprises: a powder reservoir; a dispenser for the powder; an endless chain in communication with said reservoir and said dispenser; a drive wheel for said endless chain; a turn-around wheel spatially disposed from said drive wheel and cooperating with said wheel for holding said chain substantially taut; said drive and turn-around wheels being positioned to maintain said chain in substantially a single plane substantially parallel to the surface upon which the film of powder is being applied; a conduit surrounding at least a portion of said chain in said dispenser and having a series of spaced holes communicating with said dispenser; a drive means for driving said drive wheel; gear means operably connecting the drive means and the drive wheel; a stationary mounting for said drive means, the mounting permitting limited rotating movement of the drive means, gear means and drive wheel relative thereto; and, spring means biasing the drive means, gear means and drive wheel to prevent rotation, increased tension on the chain being effective to cause said rotation and overcome the spring means, thereby causing the tension to dissipate.

* * * * *